(12) United States Patent
Lin

(10) Patent No.: US 6,701,068 B2
(45) Date of Patent: Mar. 2, 2004

(54) DOUBLE HEATING DEVICE FOR COFFEE MAKER

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/201,836

(22) Filed: Jul. 24, 2002

(65) Prior Publication Data
US 2004/0018009 A1 Jan. 29, 2004

(51) Int. Cl.7 ................................................ F24H 1/10
(52) U.S. Cl. .......................... 392/480; 392/465; 99/281
(58) Field of Search ................................ 392/465, 479, 392/481, 480; 99/280, 281, 305

(56) References Cited

U.S. PATENT DOCUMENTS 3,552,298 A * 1/1971 Bufkin et al. ................. 99/281
5,193,139 A * 3/1993 Schiettecatte ................ 392/480
5,551,331 A * 9/1996 Pfeifer et al. ................. 99/280
6,481,339 B1 * 11/2002 Castleberry ................. 99/305

* cited by examiner

Primary Examiner—Edward K. Look
Assistant Examiner—Thor Campbell
(74) Attorney, Agent, or Firm—Alan D. Kamrath

(57) ABSTRACT

A heating device for a coffee maker having a water tank and a coupled pipe is provided. The pipe includes a cold-water supply section, a first heating section, a first hot-water supply section, a second auxiliary heating section, and a second hot-water supply section having an outlet. The heating device includes a first heating element contacting the first heating section and a second heating element contacting the second auxiliary heating section. Water flowing through the pipe is sequentially heated by the first and second heating elements. Thus, a temperature of water leaving the outlet can be kept at an acceptably high level.

16 Claims, 4 Drawing Sheets

DOUBLE HEATING DEVICE FOR COFFEE MAKER

FIELD OF THE INVENTION

The present invention relates to coffee makers and more particularly to an electric heating device having two heating elements for a coffee maker for increasing a temperature of hot water leaving an outlet.

BACKGROUND OF THE INVENTION

A heating device for a coffee maker or water dispenser is well known. A conventional electric heating device 30 for a coffee maker is shown in FIG. 1 in which a portion of a cold-water supply line 20 connected to the bottom of a water tank 10 is contacted by the electric heating device 30 so that water flowing through the cold-water supply line 20 can be heated. The heated water is then fed to a hot-water supply line 40 prior to leaving an outlet 50.

However, the prior art suffered from a disadvantage. For example, the hot-water supply line 40 may be relatively long so that temperature of the heated water leaving the outlet 50 may drop significantly because there is no insulation around the hot-water supply line 40 for keeping the temperature of water leaving the outlet 50 at almost the same as that measured at the start of the hot-water supply line 40. In other words, the water is not as hot as expected. Thus, the need for improvement exists.

SUMMARY OF THE INVENTION

It is therefore an object of the present invention to provide an electric heating device for a coffee maker having a water tank and a water pipe coupled to the bottom of the water tank, the pipe including a cold-water supply section, a first heating section, a first hot-water supply section, a second auxiliary heating section, and a second hot-water supply section having an outlet. The heating device comprises a first heating element contacting the first heating section; and a second heating element contacting the second auxiliary heating section. Water flowing from the water tank to the first heating section via the cold-water supply section is first heated by the first heating element. The heated water flows in turn from the first heating section to the second auxiliary heating section via the first hot-water supply section for being further heated by the second heating element. Finally, the further heated water is fed to the second hot-water supply section prior to leaving the outlet. By utilizing the invention, a temperature of water leaving the outlet can be kept at an acceptably high level.

The above and other objects, features and advantages of the present invention will become apparent from the following detailed description taken with the accompanying drawings.

DETAILED DESCRIPTION OF THE PREFERRED EMBODIMENTS

Figure 1:
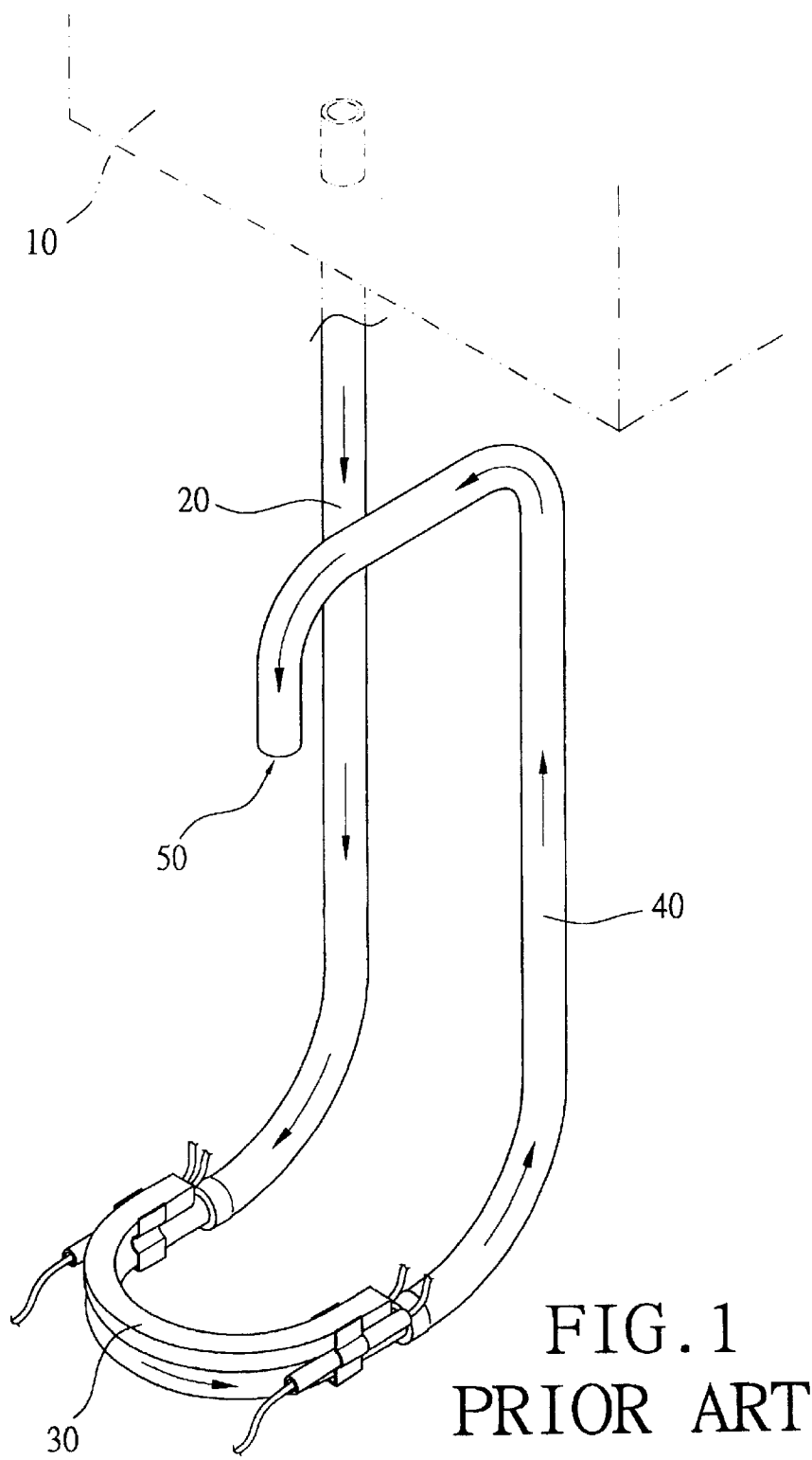
FIG. 1 is a perspective view showing a conventional heating arrangement for a coffee maker.
Figure 2:
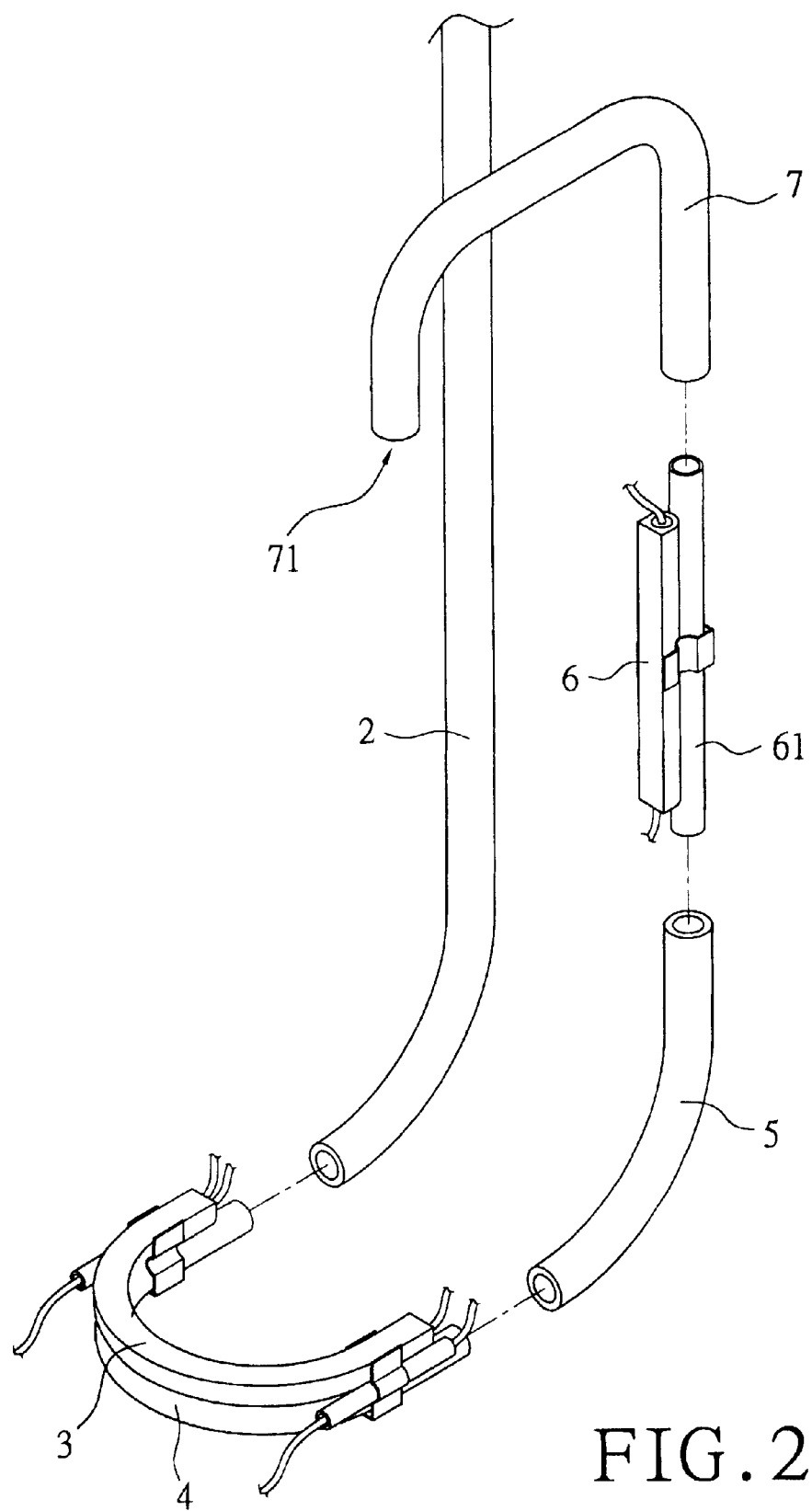
FIG. 2 is an exploded view of a preferred embodiment of a double beating device mounted on a water pipe of a coffee maker according to the invention.
Figure 3:
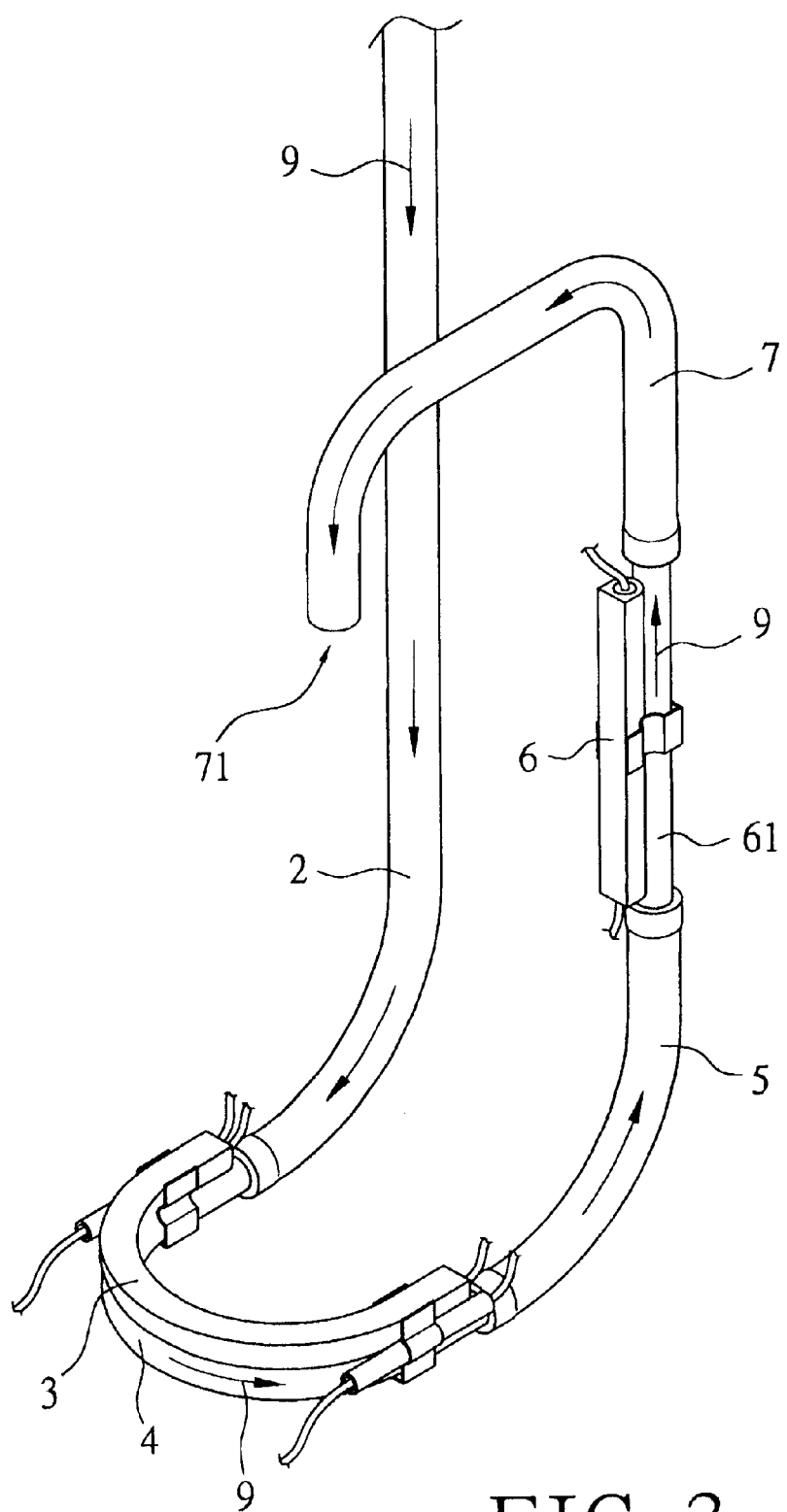
FIG. 3 is a perspective view of the assembled heating device and the water pipe of FIG. 2.
Figure 4:
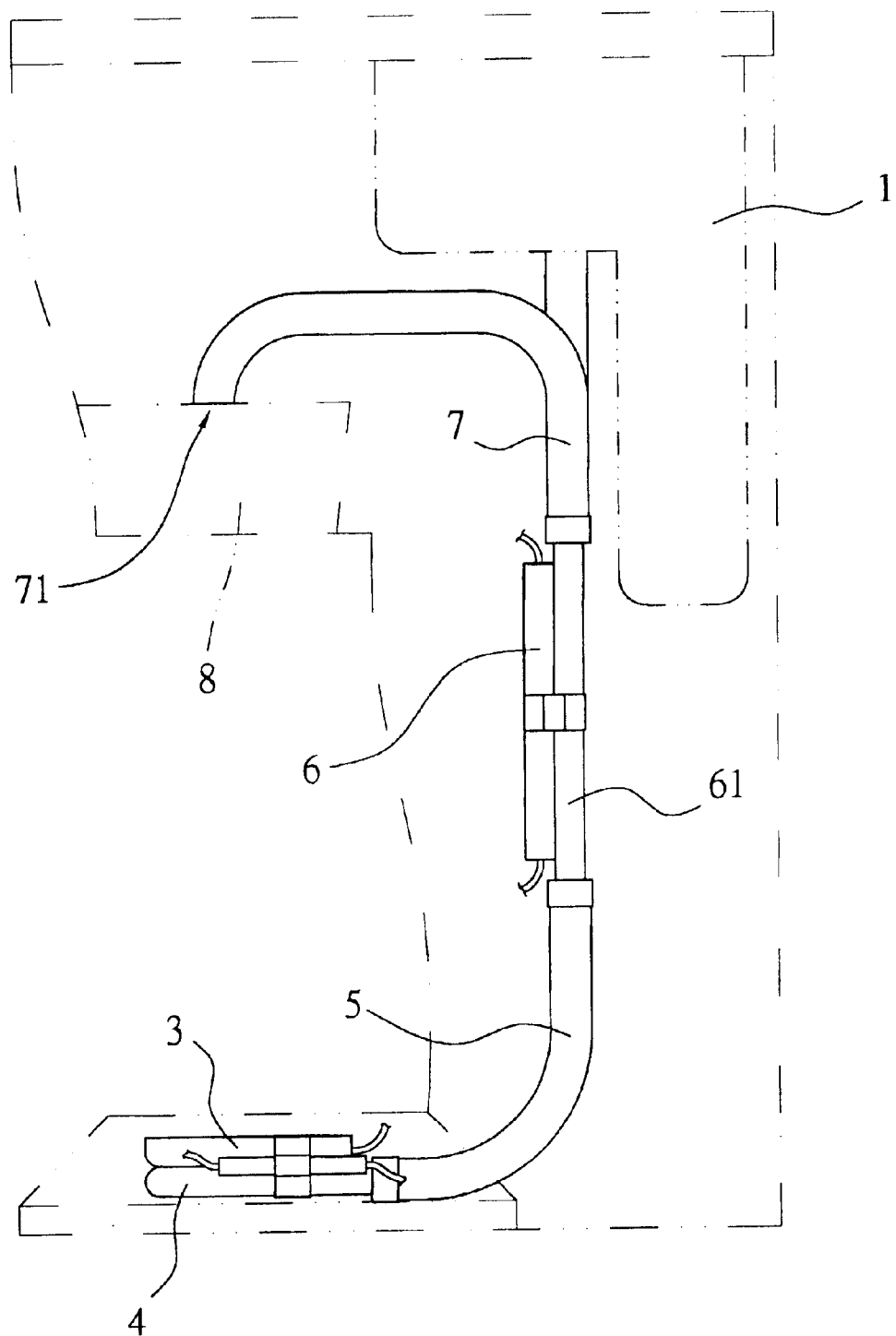
FIG. 4 is a side view schematically showing a connection of the water pipe to a water tank with the heating device mounted along portions of the water pipe.

Referring to FIGS. 2, 3 and 4, there is shown an arrangement of an electric heating device for a coffee maker in accordance with the invention. As shown, a pipe connected to the bottom of a water tank 1 consisting of a cold-water supply section 2, a first heating section 4, a first hot-water supply section 5, a second auxiliary heating section 61, and a second hot-water supply section 7 having an outlet 71. The heating device comprises a first heating element 3 contacting a first heating section 4 and a second heating element 6 contacting the second auxiliary heating section 61. It is designed that water 9 flowing from the water tank 1 to the first heating section 4 via the cold-water supply section 2 is first heated by the first heating element 3. The heated water 9 then flows from the first heating section 4 to the second auxiliary heating section 61 via the first hot-water supply section 5 for being further heated by the second heating element 6. The further heated water 9 is fed to the second hot-water supply section 7 prior to flowing into a container 8 via the outlet 71.

It is envisaged that a temperature of water 9 leaving the outlet 71 can be kept at an acceptably high level. Also, the length of the pipe is not critically important since three or more heating elements may be installed along the pipe, as needed, for keeping the temperature of water 9 leaving the outlet 71 at an acceptable level.

While the invention has been described by means of specific embodiments, numerous modifications and variations could be made thereto by those skilled in the art without departing from the scope and spirit of the invention set forth in the claims.

What is claimed is:

1. A heating device for a coffee maker having a water tank and a water pipe coupled to the bottom of the water tank, the pipe including a cold-water supply section, a first heating section, and a hot-water supply line having an outlet, the heating device comprising:

a first heating element contacting the first heating section, with the hot-water supply line comprising a first hot-water supply section, a second auxiliary heating section and a second hot-water supply section, with the first hot-water supply section located intermediate the first and second heating sections; and a second heating element contacting the second auxiliary heating section;

wherein water flowing from the water tank to the first heating section via the cold-water supply section is first heated by the first heating element, the heated water flows from the first heating section to the second auxiliary heating section via the first hot-water supply section for being further heated by the second heating element, and the further heated water is fed to the second hot-water supply section prior to leaving the outlet, with the first heating element being separately formed from and electrically independent from the second heating element.

2. The heating device of claim 1 with the first and second heating elements being rod type heating elements having a shape corresponding to the first heating section and the second auxiliary heating section, respectively.

3. The heating device of claim 2 with the first heating element contacting the first heating section by being clipped thereon, and with the second heating element contacting the second auxiliary heating section by being clipped thereon.

4. The heating element of claim 3 with the first heating section and the first heating element being U-shaped, the first hot-water supply section being L-shaped, and the second auxiliary heating section and the second heating element being linearly straight.

5. The heating element of claim 4 with the cold-water supply section being linearly straight and parallel to the second auxiliary heating section.

6. The heating element of claim 5 with the second hot-water supply section being U-shaped in a plane including the second auxiliary heating section.

7. The heating element of claim 6 with the first heating section and the first heating element being in a plane perpendicular to the plane of the second hot-water supply section.

8. The heating element of claim 1 with the second hot-water supply section being U-shaped in a plane including the second auxiliary heating section.

9. The heating element of claim 8 with the first heating section and the first heating element being in a plane perpendicular to the plane of the second hot-water supply section.

10. The heating element of claim 9 with the first heating section and the first heating element being U-shaped, the first hot-water supply section being L-shaped, and the second auxiliary heating section and the second heating element being linearly straight.

11. The heating element of claim 10 with the cold-water supply section being linearly straight and parallel to the second auxiliary heating section.

12. The heating element of claim 9 with the cold-water supply section being linearly straight and parallel to the second auxiliary heating section.

13. The heating element of claim 1 with the first heating section and the first heating element being U-shaped, the first hot-water supply section being L-shaped, and the second auxiliary heating section and the second heating element being linearly straight.

14. The heating element of claim 13 with the cold-water supply section being linearly straight and parallel to the second auxiliary heating section.

15. The heating element of claim 1 with the cold-water supply section being linearly straight and parallel to the second auxiliary heating section.

16. The heating device of claim 1 with the first heating element contacting the first heating section by being clipped thereon, and with the second heating element contacting the second auxiliary heating section by being clipped thereon.

* * * * *